Aug. 18, 1953
E. F. BACON
2,649,029
SIGNAL REFLECTOR FOR AUTOMOTIVE
VEHICLES, AND THE LIKE
Filed March 17, 1950
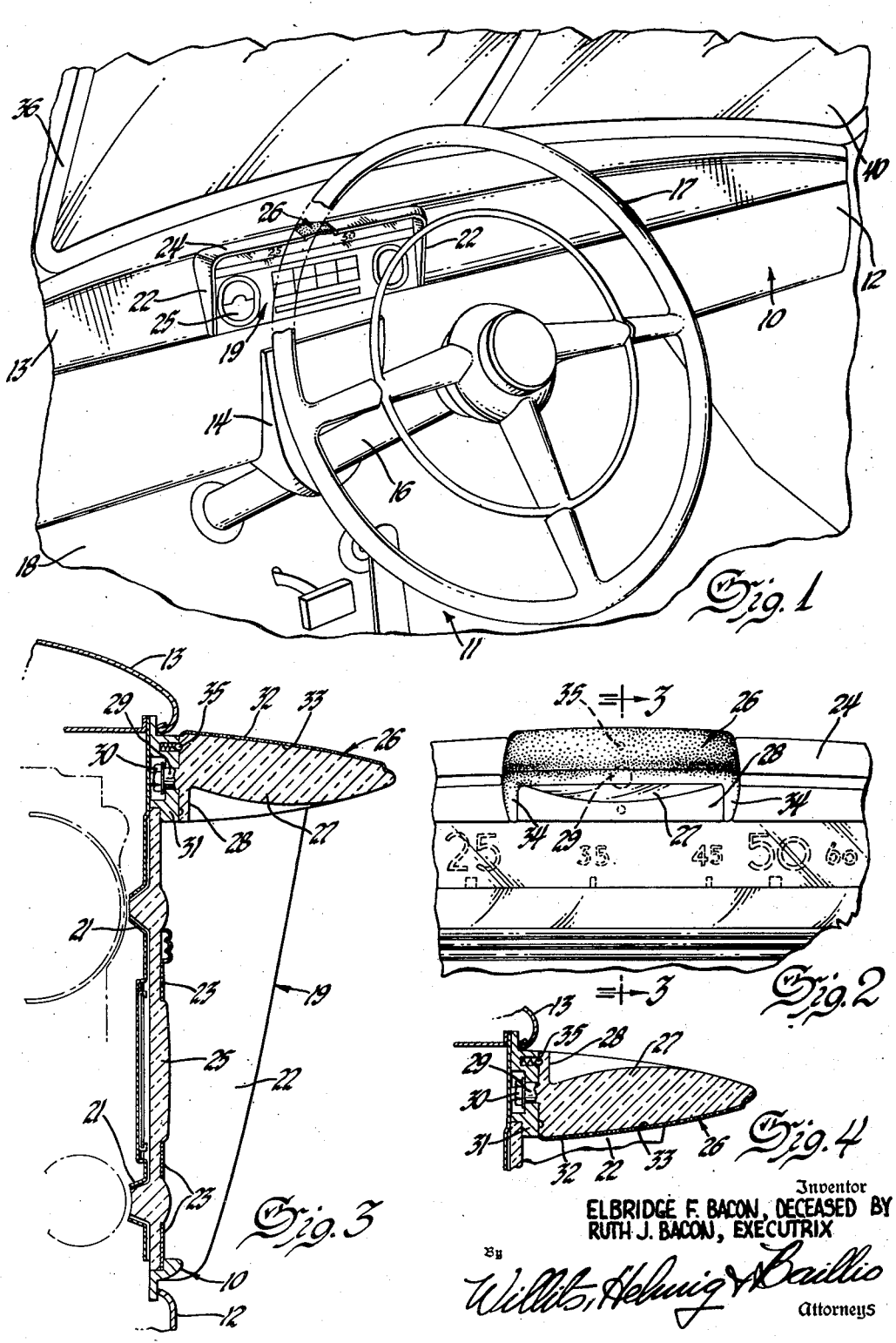
Inventor
ELBRIDGE F. BACON, DECEASED BY
RUTH J. BACON, EXECUTRIX
By Willits, Helwig & Baillio
Attorneys Patented Aug. 18, 1953

2,649,029

UNITED STATES PATENT OFFICE 2,649,029

SIGNAL REFLECTOR FOR AUTOMOTIVE VEHICLES AND THE LIKE

Elbridge F. Bacon, deceased, late of Flint, Mich., by Ruth J. Bacon, executrix, Flint, Mich., assignor to General Motors Corporation, Detroit, Mich., a corporation of Delaware Application March 17, 1950, Serial No. 150,136

5 Claims. (Cl. 88—93)

1

This invention relates to means for detecting signals out of the direct line of vision of an observer and it has particular relation to a light converging and reflecting lens suitable for location upon the instrument panel of an automobile for viewing traffic signal lights when an automobile is stopped at a street light in such a position that the street light is not otherwise visible to the operator.

It has been the practice heretofore to provide both optical viewers and reflectors for viewing traffic at angles not within the line of vision of the operator of an automobile. Also it has been customary to provide optical viewers for viewing street lights and for other purposes. These have been used in various places upon automobiles and have been provided with various mounting or fastening devices for holding the same in various adjustable positions on the vehicle and with respect to the operator thereof. But, these devices ordinarily have not been made in such a way as to blend or merge into the design of any particular part of an automobile and particularly it has not been customary to make these devices merge with and become a part of the instrument panel of an automobile. For example, the optical viewers mentioned ordinarily have been positioned on the windshield or the top of the instrument panel of an automobile where they may be seen at all times and where they may at times interfere with the view of the vehicle operator. Also these devices when so positioned often collect the rays of the sun, spotlights or headlights of other automobiles, or electric signs positioned along a street or highway. When such lights are so collected and converge within the lens of such a device they often become distracting and annoying to the vehicle operator, and so interfere with the vehicle operation.

It is an object of the invention to provide a device for viewing signals not otherwise observable by an operator of an automobile and to position this device within the automobile in such a way that it can be used or not used depending upon the operator's preference. Whether the device is being used or not, the device will merge into the general configuration of the surface of some part of the automobile; it will not be unsightly; and, it will not stand out from the part of the automobile by which it is supported in such a way as to interfere with the operator's vision.

It is also an object of the invention to provide a traffic signal viewing device which will not

2 bring into focus or reflect other lights adjacent a street or highway that the operator is not required to observe in meeting the safety requirements for operating an automobile.

For a better understanding of the invention reference may now be had to the accompanying drawing forming a part of this specification, in which:

Figure 1 is a perspective view of the front part of an automobile, taken from the inside of the automobile, and illustrating particularly an instrument panel having embodied therein a signal light reflector embracing the principles of this invention.

Figure 2 is an enlarged fragmentary view of a portion of the instrument panel illustrated by Figure 1; particularly that part of the panel embracing the light reflecting means embodied within the instrument panel illustrated by Figure 1.

Figure 3 is a transverse and vertical sectional view of the structure illustrated by Figures 1 and 2, Figure 3 being taken substantially in the plane of line 3—3 on Figure 2.

Figure 4 is a fragmentary illustration of the structure disclosed by Figure 3 with the light reflecting means thereon rotated throughout 180°.

In illustrating the invention there is employed an instrument panel 10 which projects across and forms a part of the front portion of an automobile which is indicated generally at 11. The instrument panel 10 has a relatively upright or vertically disposed front wall indicated at 12 and a relatively horizontal and forwardly projecting top wall indicated at 13. The front wall or panel 12 has a bracket 14 projecting therefrom and through the lower portion of which projects a steering column 16 on the upper end of which a steering wheel 17 is mounted. The steering column 16 projects from the floor 18 of the vehicle and at such an angle as to be accessible to the vehicle operator for operating the same.

The top panel or part 13 has an instrument cluster panel 19 formed in a vertically disposed part thereof, at one side of the instrument panel 10 and directly in front of the vehicle operator. In such position the vehicle operator may view the cluster panel 19 through the steering wheel 17. The cluster panel 19 has slots and openings formed therein and indicated generally at 21 for viewing through such openings the indicia of speedometers, gasoline gauges, clocks, radio control apparatus, etc. Along the top and down two sides of the cluster panel 19 is formed a ledge or lightshield indicated at 22, this being formed and designed in such way as to merge with and form a continuation of the design of the entire instrument panel 10. The ledge or shield projects outwardly from the instrument panel 10 and particularly from the cluster panel 19 in such way as to limit the illumination of the cluster panel only to the front surface thereof. Such surface is covered by a partly masked glass or other suitable front part indicated at 23 which is provided with transparent sections for viewing the indicia of the instruments supported behind the cluster panel.

Along the top 24 of the ledge or shield 22 is an inserted reflector part 26 which merges with and forms a relatively harmonious part of the top or upper ledge part indicated at 24. Reflector part 26 comprises a movably mounted viewing device or signal light reflector which can be rotated throughout an angle of 180° with respect to the top 24 and into a position in which it will also form a relatively continuous and harmonious part of the top 24 of the ledge 22. The reflector 26 comprises a convex lens indicated at 27 which is formed in such way as to provide a shoulder or a bracket 28, the central portion of which projects laterally to provide a stud indicated at 29. Stud 29 projects through an opening in a mounting 31 which is secured in an opening in the glass 25 and against the front surface of a vertical front portion of the top 12 of the instrument panel 10. The lens 27 is secured against the mounting 31 by a nut 30 which operatively engages the threaded end of the stud 29. Spring and ball detents 35 disposed in openings formed in the mounting 31 and the bracket 28 are provided for holding the reflector in either of its two operative positions.

One surface of the reflector 27 is covered by a shield 32 which is formed of the same material as the ledge 24 and which is finished in such a way as to harmonize with the finish of the ledge 24 and yet to be distinguishable therefrom. The surface of the lens 27 adjacent the cover part 32 is provided with a coating of light reflecting material of any kind suitable for the formation of a mirror surface indicated at 33.

The cover 32 projects downwardly at the opposite ends thereof as is indicated at 34 for the purpose of shielding the two sides of the lens 27 which extend in parallel relation to the line of vision of the vehicle operator when viewing the instrument cluster panel 19. The end parts 34 are formed in such way as to provide arcuate exterior surfaces, the axes of which extend along the axis of the stud 29.

Above the instrument panel 10 there is provided a windshield 40 through which the vehicle operator views the traffic forwardly of the automobile when the automobile is being operated. The frame or mounting 36 of the windshield 40 therefore normally limits the normal range of forward vision of the vehicle operator when driving the automobile.

It will be apparent that the reflector 26 is below such normal range of vision of the vehicle operator and therefore does not interfere with the vision of the operator when driving the automobile. Also it will be noted that the reflector 26 will not collect and reflect lights and other images within the casual range of vision of the operator, when the reflector is in the position illustrated by Figure 2. In such position the reflector is not only upside down, but it is covered by the part 32 which merges with the ledge 24 and is provided with a finish that does not differ greatly from the finish of the ledge 24.

The operator of the vehicle therefore can drive the automobile along a street or highway without having lights along the street or highway reflected or otherwise brought within the operator's direct or casual range of vision. However, when the vehicle is stopped at a street light which is high enough in the air to be out of the normal range of vision of the operator when viewing traffic through the windshield 40 then the vehicle operator may see a reduced and reflected image of the street light simply by taking hold of the reflector 26 and turning the same throughout an angle of 180°. Then the convex surfaces of the lens will cause the image of the street light to appear upon and be reflected by the reflecting surface 33 of the reflector 26. Thereupon the vehicle operator may see the reduced and reflected image of the street light merely by looking through the steering wheel 17 and at the light reflecting surface 33.

When the signal or street light changes in such way as to permit the vehicle to proceed, then the operator may turn the reflector 26 over again and into the position indicated by Figure 2. In such position the operator may continue to drive the vehicle without the interference normally involved in the use of such light reflecting and optical viewing devices.

What is claimed is:

1. In a motor vehicle street signal reflecting mechanism the combination of an instrument panel which includes a top wall portion having an opening formed therein, a reflecting device including an image reflecting surface and a non-image reflecting surface, said reflecting device being adapted to be mounted on said wall and disposed substantially entirely within said opening so that at least one of said surfaces may be substantially flush with the upper surface of said top wall, said surfaces being substantially coextensive with said opening, and means on said wall for rotatably supporting said reflecting device within said opening, said reflecting device being rotatable to a first position within said opening in which the image reflecting surface is substantially coextensive with said opening and is visible to the vehicle operator whereby a street signal not within the vehicle operator's normal range of vision is viewable therein, said reflecting device being rotatable to a second position within said opening in which the non-image reflecting surface is substantially coextensive with said opening and similarly visible to the operator.

2. In a motor vehicle street signal reflecting mechanism the combination of an instrument panel having a top wall portion which includes an opening formed therein, a convex lens having an image reflecting surface and a non-image reflecting surface, said lens being adapted to be mounted on said wall and disposed substantially entirely within said opening so that at least one of said lens surfaces may be substantially flush with the upper surface of said wall, said surfaces being substantially coextensive with said opening, a means mounted on said wall for movably supporting said lens within the opening in said wall, and a detent mechanism adapted to coact with said wall and said lens to lock said lens in any one of a plurality of positions with respect to said wall, said lens being rotatable to a first position within said opening in which said image reflecting surface is substantially coextensive with said opening and is visible to the vehicle operator whereby a street signal not within the operator's normal range of vision is visible therein, said lens being rotatable to a second position within said opening in which the non-image reflecting surface is substantially coextensive with said opening and similarly visible to the operator.

3. In a motor vehicle street signal reflecting mechanism the combination of an instrument panel which includes a top wall portion having an opening formed therein, a reflecting device including an image reflecting surface and a non-image reflecting surface, said reflecting device being adapted to be mounted on said wall and disposed substantially entirely within said opening so that at least one of said surfaces may be substantially flush with the upper surface of said top wall, said surfaces being substantially coextensive with said opening, an element projecting from said reflecting device, a portion of said wall being formed adjacent said opening to receive said element for rotatably supporting the reflecting device within the opening in said wall, and a detent mechanism adapted to coact with said wall and said reflecting device to lock said device in any one of a plurality of positions with respect to said wall, said reflecting device being rotatable to a position in which said image reflecting surface is substantially coextensive with said opening and is visible to the vehicle operator whereby a street signal not within the operator's normal range of vision is viewable therein, said device being rotatable to another position in which the non-image reflecting surface is substantially coextensive with said opening and similarly visible to the operator.

4. In a motor vehicle street signal reflecting mechanism the combination of an instrument panel which includes a top wall portion having an opening formed therein, a reflecting device including an image reflecting surface and a non-image reflecting surface, said device being adapted to be mounted on said wall and disposed substantially entirely within said opening so that at least one of said surfaces may be substantially flush with the upper surface of said wall, said surfaces being substantially coextensive with said opening, a means on said wall for rotatably supporting said reflecting device within said wall opening, a spring biased detent member mounted in said wall adjacent said opening, a plurality of indentations formed in the reflecting device, said indentations being adapted to severally receive said detent member to provide a plurality of positions for the reflected device relative to the wall, said reflecting device being rotatable to a position in which said image reflecting surface is substantially coextensive with said opening and is visible to the vehicle operator whereby a street signal not within the vehicle operator's normal range of vision is viewable therein, said device being rotatable to another position in which the non-image reflecting surface is substantially coextensive with said opening and similarly visible to the operator.

5. In a motor vehicle street signal reflecting mechanism the combination of an instrument panel which includes a top wall portion having an opening formed therein, a lens including an image reflecting surface and an oppositely disposed non-image reflecting surface, said lens being adapted to be mounted on said wall and disposed substantially entirely within said opening so that at least one of said lens surfaces may be substantially flush with the upper surface of said wall, said surfaces being substantially coextensive with said opening, an element integrally formed with and projecting from said lens, a portion of said wall being formed adjacent said opening to receive said element for rotatably supporting the lens within the wall opening, a spring biased detent member mounted in said wall adjacent said opening, and a plurality of indentations formed in the lens, said indentations being adapted to severally receive the detent member to provide a plurality of positions for the lens relative to said wall, said image reflecting surface being substantially coextensive with said opening and visible to the vehicle operator when said lens is rotated into one of said positions whereby a street signal not within the operator's normal range of vision is viewable therein, said lens being rotatable to a second position in which said oppositely disposed non-image reflecting surface is substantially coextensive with said opening and similarly visible to the operator.

RUTH J. BACON,
Executrix of the estate of Elbridge F. Bacon, deceased.

References Cited in the file of this patent

UNITED STATES PATENTS

| Number | Name | Date |
| --- | --- | --- |
| 1,750,947 | Vons | Mar. 18, 1930 |

FOREIGN PATENTS

| Number | Country | Date |
| --- | --- | --- |
| 423,815 | Great Britain | Feb. 8, 1935 |